(12) United States Patent  
Solomon

(10) Patent No.: US 6,536,796 B1  
(45) Date of Patent: Mar. 25, 2003

(54) COLLAPSIBLE WAGON

(76) Inventor: Stephanie Solomon, 5471 Logan Arms, Girard, OH (US) 44420

( * ) Notice: Subject to any disclaimer, the term of this patent is extended or adjusted under 35 U.S.C. 154(b) by 0 days.

(21) Appl. No.: 09/896,295

(22) Filed: Jul. 2, 2001

(51) Int. Cl.$^7$ ................................................. B62B 3/02
(52) U.S. Cl. ..................... 280/651; 280/47.34; 280/655
(58) Field of Search .............................. 280/651, 47.34, 280/35, 47.11, 47.18, 47.26, 47.315, 639, 655, 655.1, 87.01; 220/8, 666, 667

(56) References Cited

U.S. PATENT DOCUMENTS

| | | | | |
|---|---|---|---|---|
| 2,563,995 A | * | 8/1951 | East | 280/36 |
| 2,683,953 A | * | 7/1954 | Hopkins | 43/131 |
| 3,305,243 A | | 2/1967 | Manfredi, Jr. et al. | |
| 3,318,612 A | | 5/1967 | Kuhn | |
| 4,266,791 A | * | 5/1981 | Myers | 280/37 |
| 4,824,137 A | * | 4/1989 | Bolden | 280/652 |
| 4,982,857 A | * | 1/1991 | Sher | 220/8 |
| 5,249,823 A | * | 10/1993 | McCoy et al. | 280/656 |
| 5,538,267 A | | 7/1996 | Pasin et al. | |
| 5,560,458 A | * | 10/1996 | Franklin et al. | 190/115 |
| 5,833,251 A | | 11/1998 | Peck | |
| 5,857,695 A | * | 1/1999 | Crowell | 280/651 |
| 5,876,047 A | * | 3/1999 | Dennis | 280/47.35 |
| 5,897,131 A | * | 4/1999 | Brown et al. | 280/7.12 |
| 5,957,482 A | | 9/1999 | Shorter | |
| 6,220,611 B1 | * | 4/2001 | Shapiro | 280/47.34 |
| 6,345,828 B1 | * | 2/2002 | Pool et al. | 280/32.6 |
| 6,422,405 B1 | * | 7/2002 | Haenszel | 211/175 |

* cited by examiner

Primary Examiner—Lesley D. Morris  
Assistant Examiner—Tony Winner  
(74) Attorney, Agent, or Firm—Harpman & Harpman

(57) ABSTRACT

A convertible wagon adaptable from an extending use position to a collapsed storage position. The wagon has a telescopically extensible center portion that slidably secures and separates oppositely disposed end enclosure portions. A telescopically extensible handle is provided for deployment when in use configuration allowing for directional mobility of the wagon by the user.

15 Claims, 6 Drawing Sheets

COLLAPSIBLE WAGON

BACKGROUND OF THE INVENTION

1. Technical Field

This invention relates to children's wagons that are used to transport children or other articles. These types of vehicles have convertible features for specific use requirements.

2. Description of Prior Art

Prior art devices of this type typically have a central body mounted on wheels with an extending handle by which the wagon can be pulled.

Examples of such wagons can be seen in U.S. Pat. Nos. 3,305,243, 3,318,612, 5,538,267, 5,833,215 and 5,957,248.

In U.S. Pat. No. 3,305,243 a portable luggage cart can be seen wherein a toy wheeled vehicle has a pair of hinged transport compartments.

U.S. Pat. No. 3,318,612 is directed to a foam construction kit that can be configured into a children's play vehicle having two seating areas supported on a central fixed wheeled platform.

U.S. Pat. No. 5,538,267 discloses a convertible toy wagon with additional storage capacity. A main body portion has a pair of wheel assemblies with an interchangeable handle and interior storage compartment.

In U.S. Pat. No. 5,833,215 a convertible wheeled wagon is illustrated which can be adapted into multiple sections such as a wagon, picnic table and chair as well as a child's car seat.

Finally, in U.S. Pat. No. 5,957,428 a folding children's wagon can be seen wherein the wagon is divided by a transverse hinge assembly so as to fold upon itself with removable wheel assemblies and rail extension elements.

Applicant's device is directed to an expandable wagon compartment with a concealed center expansion section between 2 two-wheeled enclosures and having a deployable handle.

SUMMARY OF THE INVENTION

A convertible children's wagon that provides for adaptive use and storage configurations. The wagon includes oppositely disposed interconnected sections that form a four-walled transportation compartment with a hinged handle assembly extending therefrom. An interengaged center section allows the respective end sections to be telescopically advanced from one another to a pre-determined use configuration. The handle assembly is stored beneath so as to be pivotally deployed and selectively extended for use.

DESCRIPTION OF THE PREFERRED EMBODIMENT

Figure 1:
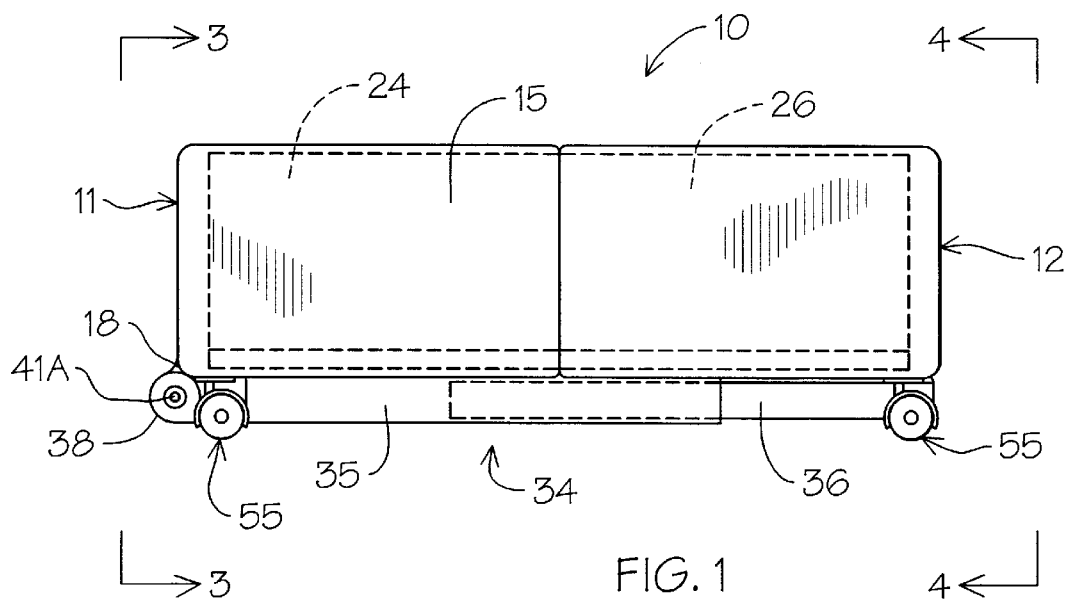
FIG. 1 is a side elevational view of the wagon in collapsed position.
Figure 2:
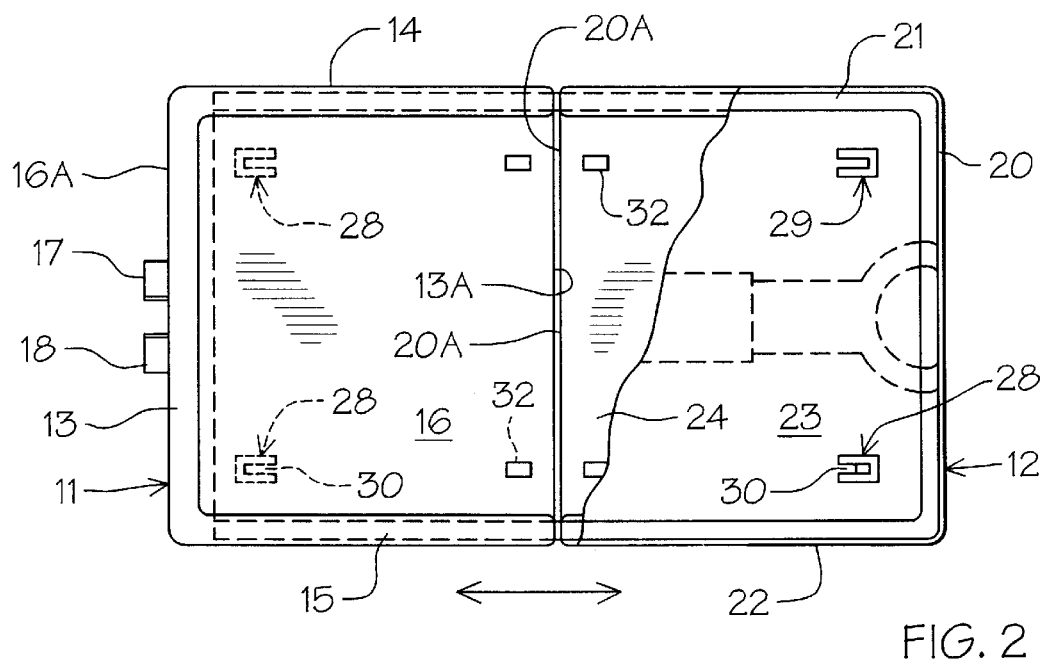
FIG. 2 is a top plan view of the wagon in collapsed position.
Figure 3:
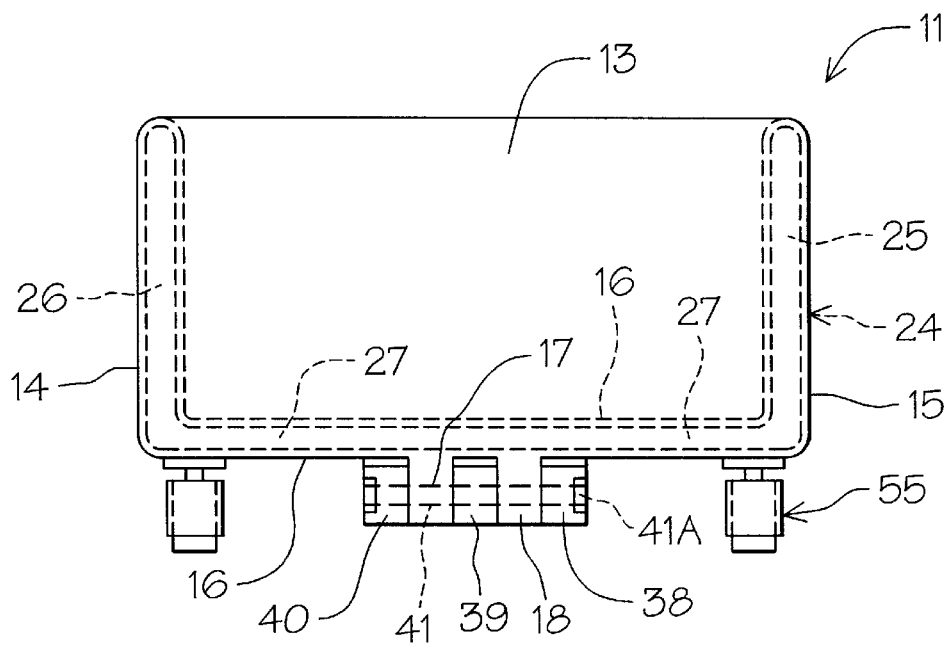
FIG. 3 is an end elevational view on lines 3—3 of FIG. 1.

Referring now to FIGS. 1–4 of the drawings, a collapsible wagon 10 can be seen having a pair of oppositely disposed front and back body portions 11 and 12. The body front portion 11 has a front end wall 13 and spaced parallel sidewalls 14 and 15 extending at right angles therefrom. The respective walls 13–15 are hollow and preferably molded of synthetic resin material with a hollow integrally formed platform 16 therebetween. A pair of apertured mounting lugs 17 and 18 extend from the perimeter edge 16A of the platform 16 midway between the respective walls 14 and 15 on the end wall 13, as best seen in FIG. 3 of the drawings.

Conversely, the back body portion 12 has a hollow molded end wall 20 and hollow spaced parallel sidewalls 21 and 22 with an integral interengaging hollow platform 23 therebetween.

Figure 4:
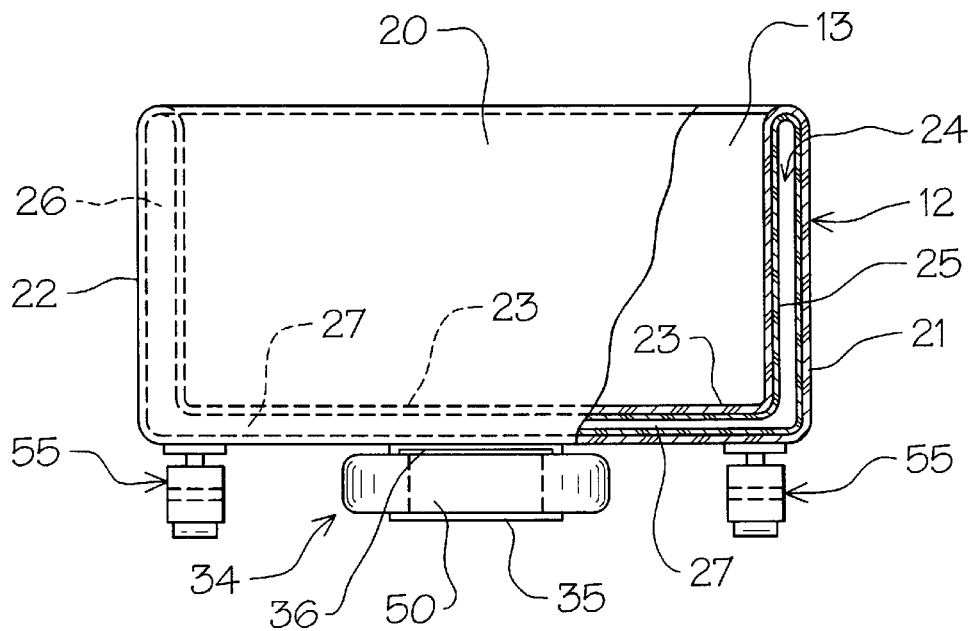
FIG. 4 is an end elevational view on lines 4—4 of FIG. 1.

An elongated generally U-shaped center section 24 is formed of oppositely disposed hollow sidewalls 25 and 26 and an interengaging hollow base 27 as seen in dotted lines in FIG. 3 of the drawings. The center section 24 is registerably disposed within the respective open ends 13A and 20A of the hollow body portions 11 and 12 as best seen in FIGS. 2, 3 and 4 of the drawings.

Figure 8:
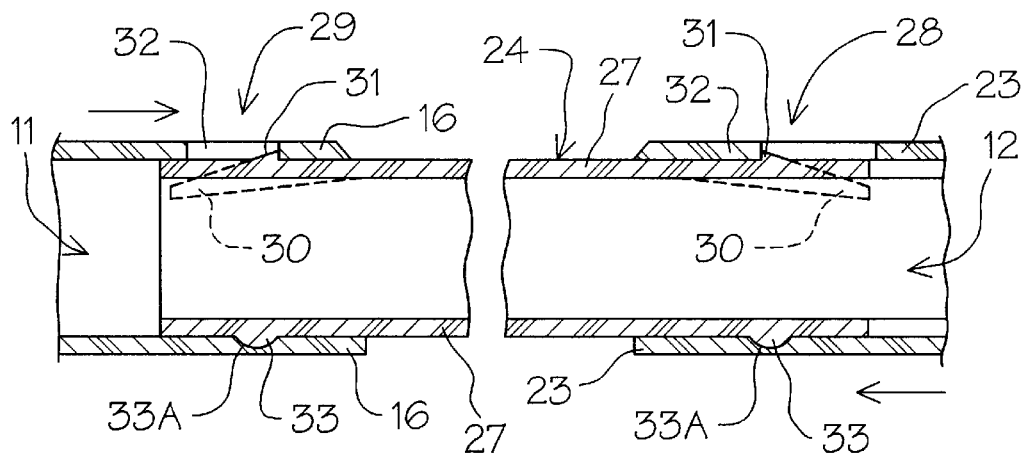
FIG. 8 is an enlarged partial cross-sectional view with portions broken away of the center section locking assembly.

Referring now to FIGS. 2 and 8 of the drawings, lock stop assemblies 28 and 29 are formed within the respective aligned inner engaging platforms 16, 23 and base 27 wherein respective resilient tabs 30 with tapered engagement flanges 31 are formed within the base 27. The flanges 31 are registerably engaged within aligned openings 32 in the respective body portions 11 and 12. Secondary locking ridges 33 extend in oppositely disposed relation to said tabs 30 from the base 27 for registration with corresponding aligned grooves 33A within the respective platforms 16 and 23, as will be understood by those within the art.

Figure 9:
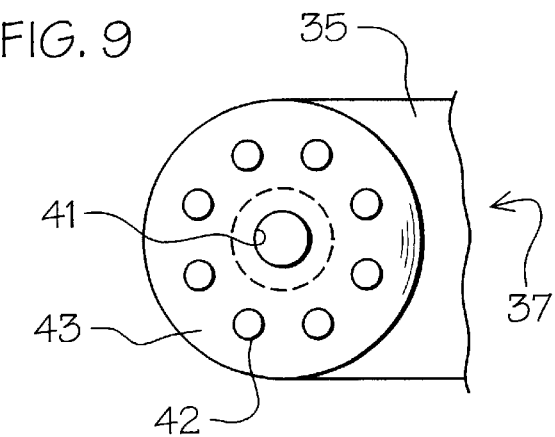
FIG. 9 is an enlarged side elevational view of a portion of the handle interengaging assembly.
Figure 10:
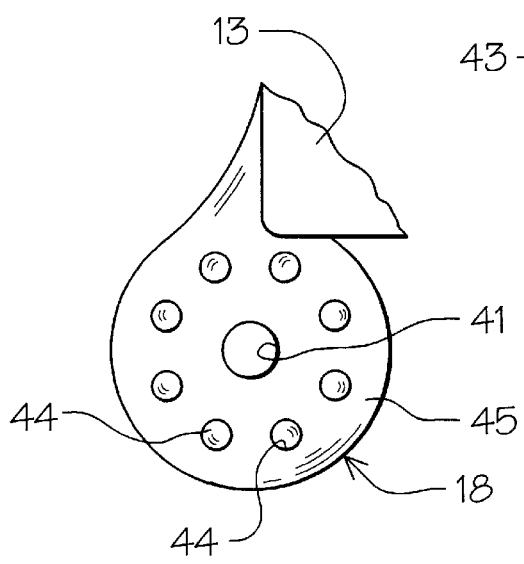
FIG. 10 is an enlarged perspective view of the wagon portion of the interengaging assemblies registerable as seen in FIG. 9.
Figure 11:
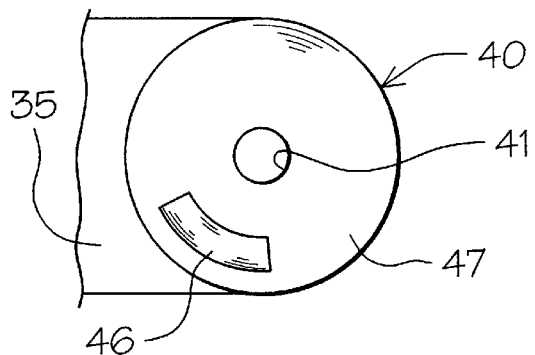
FIG. 11 is an enlarged side elevational view of the handle portion of an interlocking handle elevation assembly.
Figure 12:
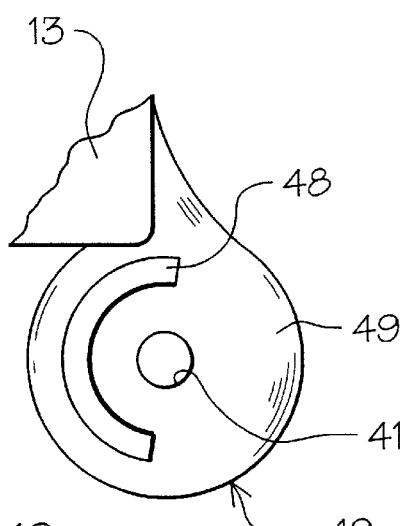
FIG. 12 is an enlarged perspective view of the wagon portion of the interengaging handle extending portion assembly shown in FIG. 11.
Figure 13:
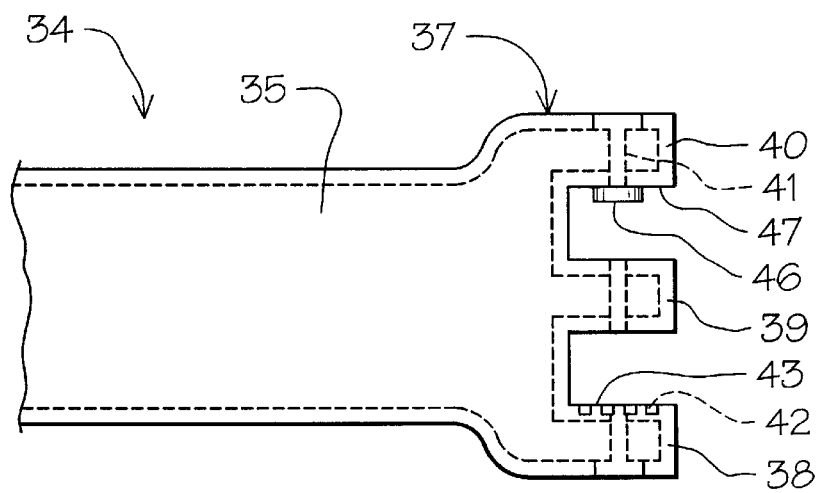
FIG. 13 is an enlarged partial top plan view of the handle interengaging portions of the wagon portion assembly.

Referring now to FIGS. 1, 2, 6, 7 and 8–13, an adjustable handle assembly 34 can be seen having a base portion 35 and an extensible hand engagement portion 36 therein. The base portion 35 is of an enlarged tubular configuration having an end area of increased transverse dimension at 37 with three transversely spaced annular engagement lugs 38, 39 and 40 formed therein. The lugs 38, 39 and 40 are centrally apertured at 41 to receive a pivot pin 41A. A plurality of annularly spaced engageable circular recesses 42 are formed within an inner surface 43 of the lug 38 as best seen in FIGS. 9 and 13 of the drawings. A plurality of annularly spaced registration buttons 44 are formed on the corresponding opposite registration surface 45 of the hereinbefore described mounting lug 18, as seen in FIG. 10 of the drawings, so as to be in selective registering engagement with said recessed areas 42 as hereinbefore described. An arcuate tab 46 is formed on an inner surface 47 of the lug 40. A corresponding semi-circular groove 48 is formed in the opposite registration surface 49 of the lug 19 as illustrated in FIG. 12 of the drawings.

Figure 5:
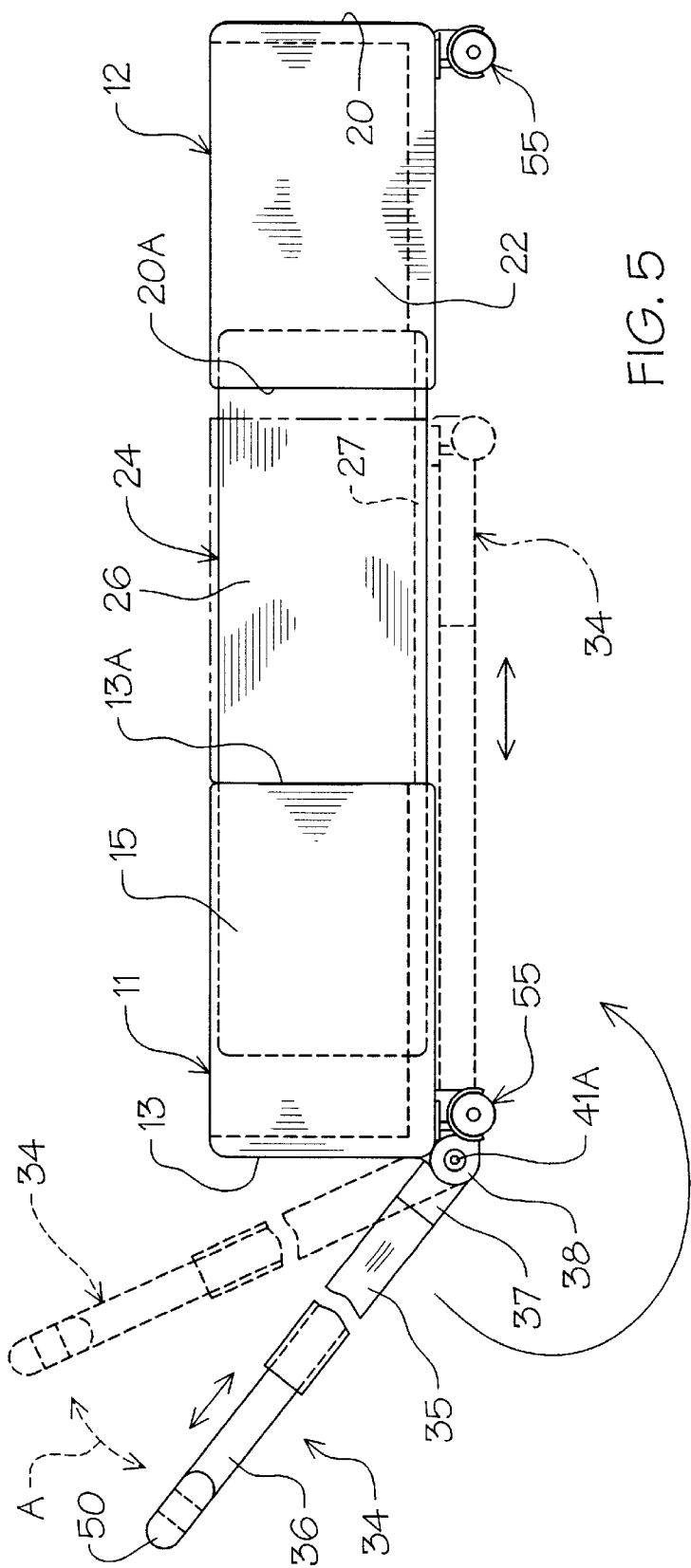
FIG. 5 is a side elevational view of the wagon in partially extended position.

It will be evident from the above description that the handle assembly 34 when registerably engaged and pivotally secured within with the pivot pin 41A can be pivoted and held in select angular positions within a 90 degree arc as illustrated in FIG. 5 of the drawings at A.

Figure 6:
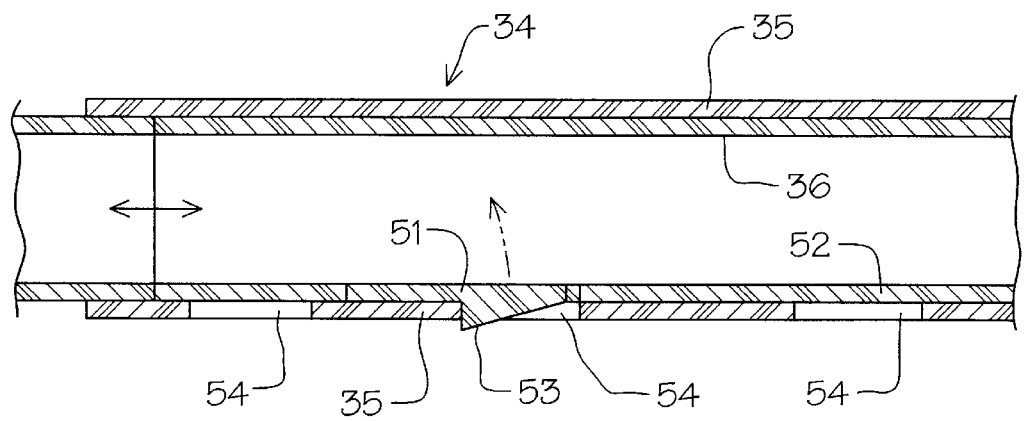
FIG. 6 is an enlarged partial cross-sectional view of an interlocking handle assembly.
Figure 7:
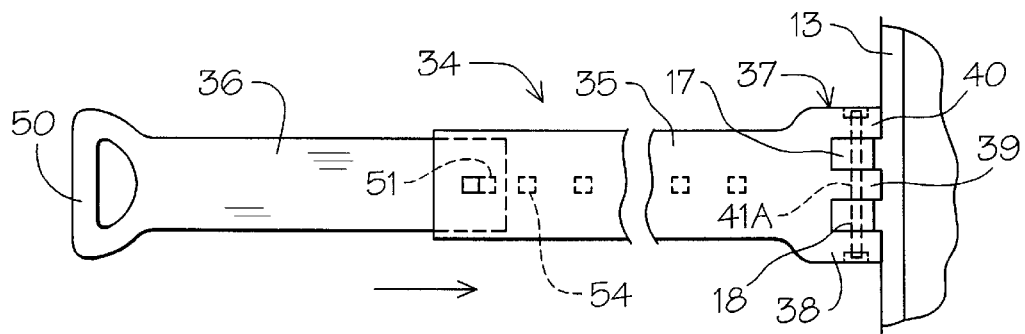
FIG. 7 is a partial top plan view of a fully extended handle assembly.

Referring now to FIGS. 6 and 7 of the drawings, the handle assembly 34 can be seen wherein the extensible handle portion 36 has a hand grip 50 and a resilient locking tab 51 formed on its lower surface 52 with tapered adjustable flange 53 extending therefrom. The flange 53 is selectively registerable within one of a plurality of longitudinally spaced apertures 54 in the handle base 35 as best seen in FIG. 7 of the drawings.

It will be seen that as the handle portion 36 is telescopically extended from the base portion 35, it will be incrementally locked by the engagement of flange 52 within the apertures 54 for selective length adjustment.

A plurality of wheel assemblies 55 are secured to the underside of the respective platforms 16 and 23 adjacent the respective end walls 13 and 20, as best seen in FIGS. 1, 3 and 5 of the drawings.

In operation, the body portions 11 and 12 can be slid apart on the center section 24 locking in fully extended position by the locking assemblies 28 and 29. The handle assembly 34 is deployed from underneath the body sections 11 and 12 and extended by incremental advancement of the handle portion 36 as seen in FIG. 5 of the drawings. The extensible handle portion 36 is incrementally held in multiple angular positions indicating by the range arrow A by interlocking engagement elements, as hereinbefore described.

Referring back now to FIG. 8 of the drawings, it will be seen that as the selective body portions 11 and 12 are separated, they are in sliding engagement on the center section 24 and when they reach maximum extension, they will lock in position by the respective locking tab assemblies 28 and 29. Additionally, the transversely extending alignment engagement ridges 33 formed on the center section 24 will engage in respective transversely aligned engagement grooves 33A in the respective body member sections 11 and 12, thus locking the wagon assembly in an extended use configuration.

Correspondingly, when the wagon 10 is to be collapsed, sufficient pressure is applied to the respective body sections 11 and 12 towards one another disengaging the locking tab assemblies 28 and 29 and locking transverse ridges 33 thus allowing the respective body portions to be collapsed over the center section 24 until they engage one another as illustrated in FIG. 1 of the drawings. The handle assembly 34 is retracted by applying force to the resilient tab 51, collapsing the handle portion 36 within the base portion 35. The handle assembly 34 is then pivotally rotated so as to engage the underside of the hereinbefore-described body portions 11 and 12.

It will be evident from the above description that when the wagon 10 is in collapsed position it can also be pulled by its extended handle portion 36 in an upright position on two of its wheel assemblies extending from the back body portion 12.

It will thus be seen that a unique and novel collapsible wagon has been illustrated and described and it will be apparent to those skilled in the art that various changes and modifications may be made therein without departing from the spirit of the invention.

Therefore I claim:

1. A collapsible wagon comprising:
   a main body member having a front portion, a center section, and a back portion, said front portion having oppositely disposes planar sidewalls and an integral planar end wall with an interconnecting platform there between, a longitudinally adjustable handle pivotally secured to said front portion, the back portion having spaced parallel planar sidewalls and an integral planar end wall with a platform extending there between;
   the center section registerable with said respective front and back portions, and said center section comprises an elongated U-shaped body member having oppositely disposed planar sidewalls; the front and back portions are telescopically slidably engaged with the center section from an extended use position to a collapsed storage position;
   multiple wheel assemblies secured to said front and back portions; and
   locking assemblies interengaging the center section with the respective front and back portions.

2. The collapsible wagon set forth in claim 1 wherein said front and back portions and said center section are hollow.

3. The collapsible wagon set forth in claim 1 wherein said handle comprises an elongated tubular base portion and a telescopically extensible hand engagement portion registerably positioned with said tubular base portion, means for selectively securing the telescopic extension length of said hand engagement portion to said base portion.

4. The collapsible wagon set forth in claim 3 wherein said means for selectively securing said telescopic extension length of said hand engagement portion to said base portion comprises a resilient tab registerable within one of select aligned spaced apertures within said handle.

5. The collapsible wagon set forth in claim 1 wherein said front portion has a pair of handle engagement lugs extending therefrom.

6. The collapsible wagon set forth in claim 5 wherein said handle further comprises a plurality of transversely aligned and spaced control lugs extending from a free end of said base portion, said control lugs registerable with said handle engagement lugs.

7. The collapsible wagon set forth in claim 6 wherein said control lugs have plurality of extending registration elements thereon.

8. The collapsible wagon set forth in claim 5 wherein said handle engagement lugs have registration recesses within engagement surfaces.

9. The collapsible wagon set forth in claim 1 wherein said locking assemblies comprises registration tabs registerable with correspondingly aligned recesses.

10. A collapsible wagon comprising:
    a main body having front and back portions slidably engageable with a center section, said front portion having oppositely disposed planar sidewalls with a front most planar end wall and an interconnecting bottom platform, said back portion having oppositely disposed planar sidewalls with a backmost planar end wall and an interconnecting bottom platform;
    a locking assembly interengaging the center section with the front and back portions when the main body is in an extended use position and a collapsed storage position;
    an extendable handle pivotally secured to said front portion, said handle comprising a base connector and a hand engagement element, said hand engagement element having a handle and a length that is extendably attached to said base element;

as adjustment mechanism for selectively extending the length of the hand engagement element from said base element; and a plurality of wheel assemblies secured to said front and back portions.

11. The collapsible wagon set forth in claim 10 wherein the center section comprises an elongated U-shaped body that is telescopically slidable with the oppositely disposed planar sidewalls and bottom platforms of said front and back portions of the main boy.

12. The collapsible wagon set forth in claim 11 wherein the extendable handle positions underneath the bottom platforms of the front and back portions when the main body is in the collapsed storage position so that the collapsible wagon can be transported by the handle by rolling at an inclined position on the wheels secured to the front portion.

13. The collapsible wagon set forth in claim 12 wherein said locking assembly comprises registration tabs that are engageable with aligned recesses when the main body is in the collapsed storage position.

14. A collapsible wagon comprising:

a main body having front and back portions slideably engageable with a center section, said front portion having oppositely disposed planar sidewalls with a front most planar end wall and an interconnecting bottom platform, said back portion having oppositely disposed planar sidewalls with a backmost planar end wall and an interconnecting bottom platform, and said center section comprising an elongated U-shaped body that is telescopically slidable with said front and back portions of the main body;

a plurality of wheel assemblies secured to said front and back portions;

a locking assembly engaging the center section with the front and back portions when the main body is in an extended use position and a collapsed storage position;

an extendable handle pivotally secured to said front portion, said handle comprising a base connector and a hand engagement element, said hand engagement element having a handle and a length that is extendably attached to said base element, the extendable handle positions underneath the bottom platforms of the front and back portions when the main body is in the collapsed storage position so that the collapsible wagon can be transported by the handle by rolling at an inclined position on the wheels secured to the front portion; and an adjustable mechanism for selectively extending the length of the hand engagement element from said base element when the collapsible wagon is in the use position.

15. The collapsible wagon set forth in claim 14 wherein said locking assembly comprises registration tabs that are engageable with aligned recesses when the main body is in the collapsed storage position.

* * * * *